United States Patent
Peterzell et al.

(10) Patent No.: US 6,496,685 B2
(45) Date of Patent: *Dec. 17, 2002

(54) PORTABLE PHONE WITH IMBEDDED BATTERY

(75) Inventors: Paul E. Peterzell, San Diego, CA (US); David J. Ross, Encinitas, CA (US); Marland Chow, Oceanside, CA (US)

(73) Assignee: Qualcomm, Incorporated, San Diego, CA (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/097,612

(22) Filed: Jun. 15, 1998

(65) Prior Publication Data

US 2001/0044281 A1 Nov. 22, 2001

(51) Int. Cl.[7] ................................................. H04B 1/38
(52) U.S. Cl. ........................ 455/90; 455/347; 455/575
(58) Field of Search ........................ 455/90, 347, 575, 455/348, 346, 349, 572; 361/814; 365/229; 379/61

(56) References Cited

U.S. PATENT DOCUMENTS

| | | | | |
|---|---|---|---|---|
| 3,984,257 A | * | 10/1976 | Zurcher | 429/1 |
| 4,995,077 A | * | 2/1991 | Malinowski | 379/355 |
| 5,047,988 A | * | 9/1991 | Mizuta | 365/229 |
| 5,475,752 A | * | 12/1995 | Mishenko | 379/433 |
| 5,510,203 A | * | 4/1996 | Hamada et al. | 429/53 |
| 5,548,824 A | * | 8/1996 | Inubushi et al. | 455/90 |
| 5,601,951 A | * | 2/1997 | Johnson et al. | 429/218 |
| 5,615,250 A | * | 3/1997 | Kobayashi | 379/61 |
| 5,872,831 A | * | 2/1999 | Zoiss et al. | 379/21 |
| 5,883,966 A | * | 3/1999 | Kubo | 381/386 |
| 5,884,197 A | * | 3/1999 | Ricardo et al. | 455/575 |
| 6,004,690 A | * | 12/1999 | Van Lerberghe | 429/100 |
| 6,068,947 A | * | 5/2000 | Tuttle | 429/158 |
| 6,157,545 A | * | 12/2000 | Janninck et al. | 361/814 |

FOREIGN PATENT DOCUMENTS

| | | | |
|---|---|---|---|
| DE | 9215085 | 4/1993 | H02J/7/00 |
| DE | 9622024 | 2/1997 | H04M/1/00 |
| EP | 0344988 | 6/1989 | H05K/5/00 |
| EP | 0344988 | * 12/1989 | H05K/5/00 |
| GB | 2302232 | 1/1997 | H04M/1/02 |
| GB | 2319655 | 5/1998 | H01M/2/10 |
| WO | 9820622 | 5/1998 | H04B/1/38 |

* cited by examiner

Primary Examiner—Thanh Cong Le
Assistant Examiner—C. Chow
(74) Attorney, Agent, or Firm—Philip R. Wadsworth; Charles D. Brown; Howard H. Seo

(57) ABSTRACT

A portable phone has an outer casing with opposite upper and lower walls, one of the walls having an opening for access to the interior of the casing, and a lid removably mounted in the opening for normally closing the opening. A main circuit board is mounted in the outer casing, with a plurality of phone components mounted on the circuit board. A predetermined region of the board aligned with the opening is left exposed or empty of components, and forms a recess for receiving a battery. The battery receiving recess has contact pads, and a battery is removably engaged in the recess with battery contacts engaging the contact pads in the recess, whereby the battery can be removed and replaced via the opening after opening the lid.

11 Claims, 3 Drawing Sheets

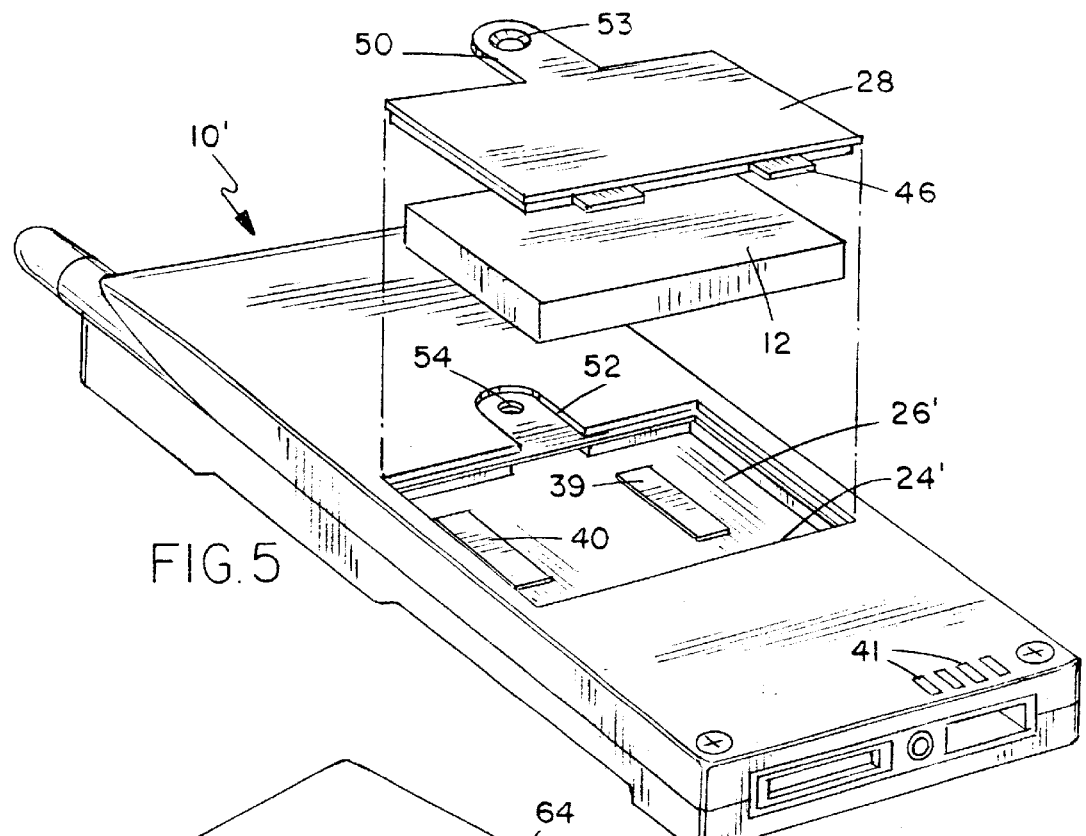
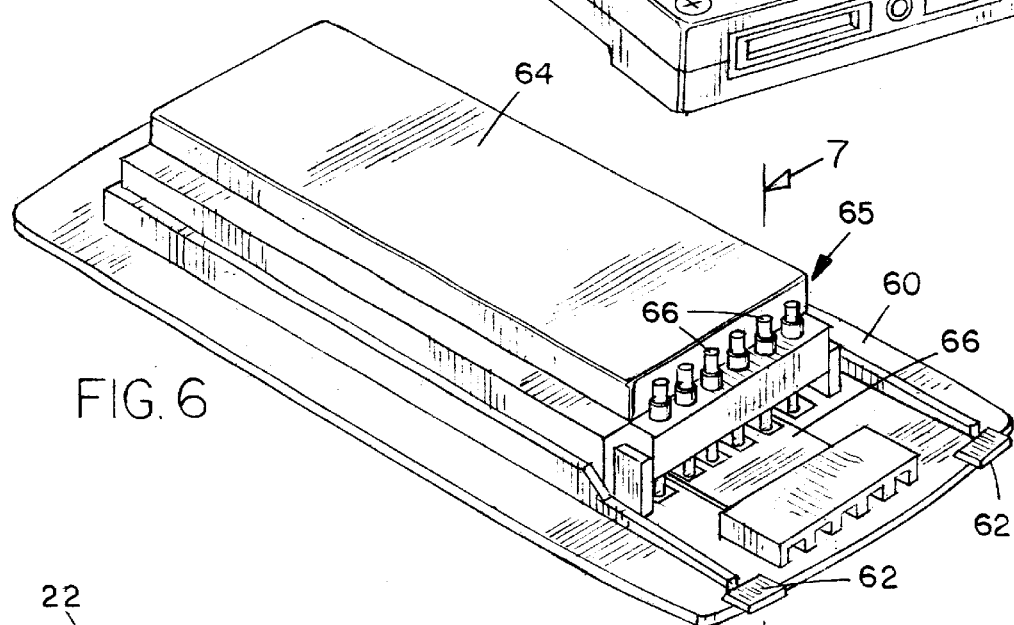
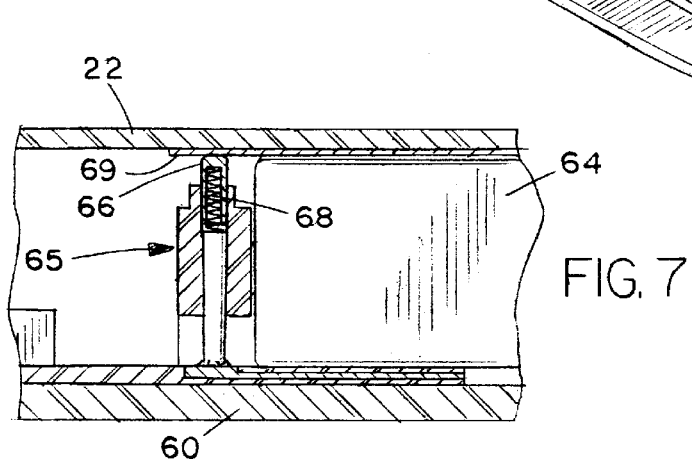

PORTABLE PHONE WITH IMBEDDED BATTERY

BACKGROUND OF THE INVENTION

The present invention relates generally to portable phones, and is particularly concerned with a portable phone having a removable imbedded battery.

Portable phones such as cellular phones typically have an outer casing in which the main circuit board and other components are mounted. The outer casing has a recess on one face for removably receiving a battery unit enclosed in a battery housing with contacts on the outside of the battery housing for engaging contacts on the recessed face of the phone casing. The battery unit may be recharged without removing it from within the phone casing.

As electronic components decrease in size, the shape and size of a portable phone is less a factor of the electronics, and the battery dominates the overall width, length, and thickness. It is preferable for the phone thickness to be minimized, and the requirement for a removable battery pack releasably held in a recess on a phone housing adds to the thickness requirements.

SUMMARY OF THE INVENTION

It is an object of the present invention to provide a new and improved portable phone having an imbedded battery.

According to the present invention, a portable phone is provided which comprises an outer casing having opposite upper and lower walls, one of the walls, e.g. the lower wall, having an opening for access to the interior of the casing, and a lid removably mounted in the opening for normally closing the opening, a main circuit board mounted in the outer casing, a plurality of phone components mounted on the circuit board with a predetermined region of the board aligned with the opening left empty to form a recess for receiving a battery, the battery receiving recess having contacts for engagement with battery contacts, and a battery removably engaged in the recess with battery contacts engaging the contacts in the recess, whereby the battery can be removed and replaced via the opening after opening the lid.

Preferably, the lid has a ridge on its inner face for snap engagement with the battery, so that the battery is secured to the lid while inside the phone, and is automatically removed with the lid when it is released from the opening. This will make battery removal and replacement easier. The battery is preferably a compact, thin battery such as a rectangular prismatic cell which has a height of around 6 mm.

This arrangement allows the phone thickness to be reduced substantially or minimized, by eliminating three wall thicknesses (one wall thickness to form the recess and two wall thicknesses, one on each of the major surfaces of the battery forming a portion of the battery casing) required in the known arrangements with removable battery packs. Instead of requiring two extra housing wall thicknesses for encasing the battery, as in the prior art, the battery is not encased but is imbedded directly in the recess provided on the circuit board or circuit card within the phone housing itself. At the same time, the user can readily access the battery to change batteries after a large number of charge and discharge cycles, without disassembling the phone.

BRIEF DESCRIPTION OF THE DRAWINGS

The present invention will be better understood from the following detailed description of some preferred embodiments of the invention, taken in conjunction with the accompanying drawings in which like reference numerals refer to like parts and in which:

FIG. 5 is a perspective rear view similar to FIG. 1 illustrating a modified embodiment of the invention;

FIG. 6 is a perspective view of the inside of a door carrying a battery for a portable phone according to another embodiment of the invention; and FIG. 7 is a section on the lines 7—7 of FIG. 6.

DESCRIPTION OF THE PREFERRED EMBODIMENTS

Figure 1:
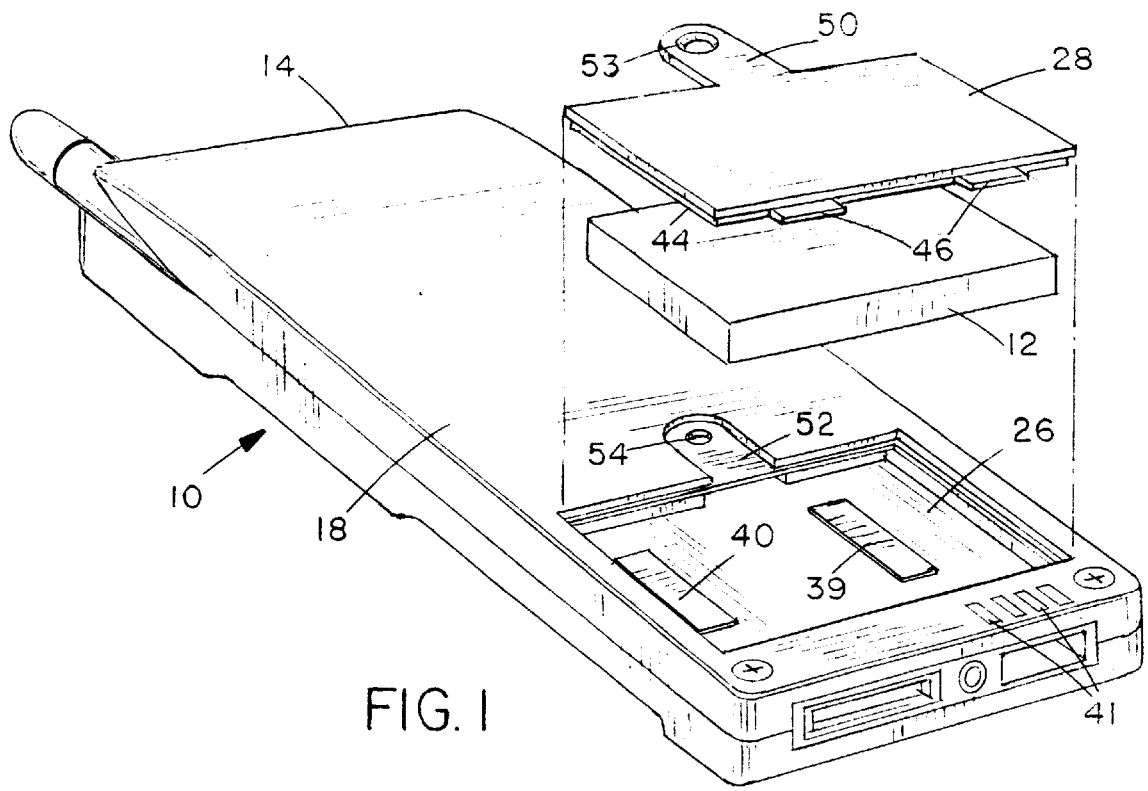
FIG. 1 is a perspective rear view of a portable phone according to a preferred embodiment of the invention with the battery and door separated.

A portable phone 10 with imbedded battery 12 according to a preferred embodiment of the present invention is illustrated in FIGS. 1 to 4. Phone 10 basically comprises an outer casing 14 having an upper wall 16 and lower wall 18 (see FIG. 3) forming an internal cavity 20 (see FIG. 4) in which a main circuit card or printed wiring board 22 is mounted. An opening 24 is provided in the lower wall 18 which is aligned with a battery receiving recess 26 on the circuit card, as best illustrated in FIG. 1. The battery receiving recess 26 is an exposed area of the printed wiring board on which no other components are mounted. A door or lid 28 is removably mountable in opening 24 to provide access to battery 12 when replacement is required. The imbedded battery is recharged only while it is installed in the phone and is capable of many recharges before it must be replaced.

Figure 2:
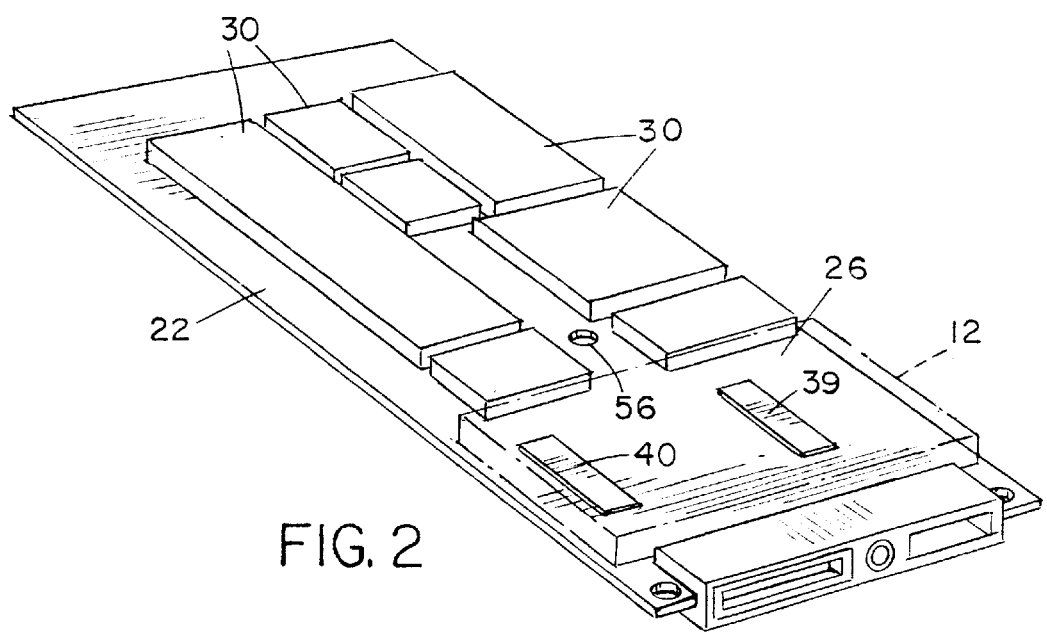
FIG. 2 is a perspective view of the main circuit board, showing the battery position and contacts.

Standard portable phone components 30 are suitably mounted on board 22 in the usual manner. The components are arranged to leave area 26 exposed, as best illustrated in FIG. 2. The components 30 will include all standard circuitry required for operating the portable phone. The size of board 22 is increased as necessary in order to accommodate all the necessary components 30 while leaving an exposed area 26 of sufficient size to receive the battery 12. This will be dependent on the size of battery to be used.

A standard keypad 32, microphone 34, display 36, and earpiece 38 are mounted on the front wall 16, and linked to circuitry and components on the board 22 in the standard manner. Positive and negative contact pads 39, 40 of conductive adhesive are provided on the exposed area 26 and linked via flex circuits to the circuitry on board 22 to provide a power input.

Figure 3:
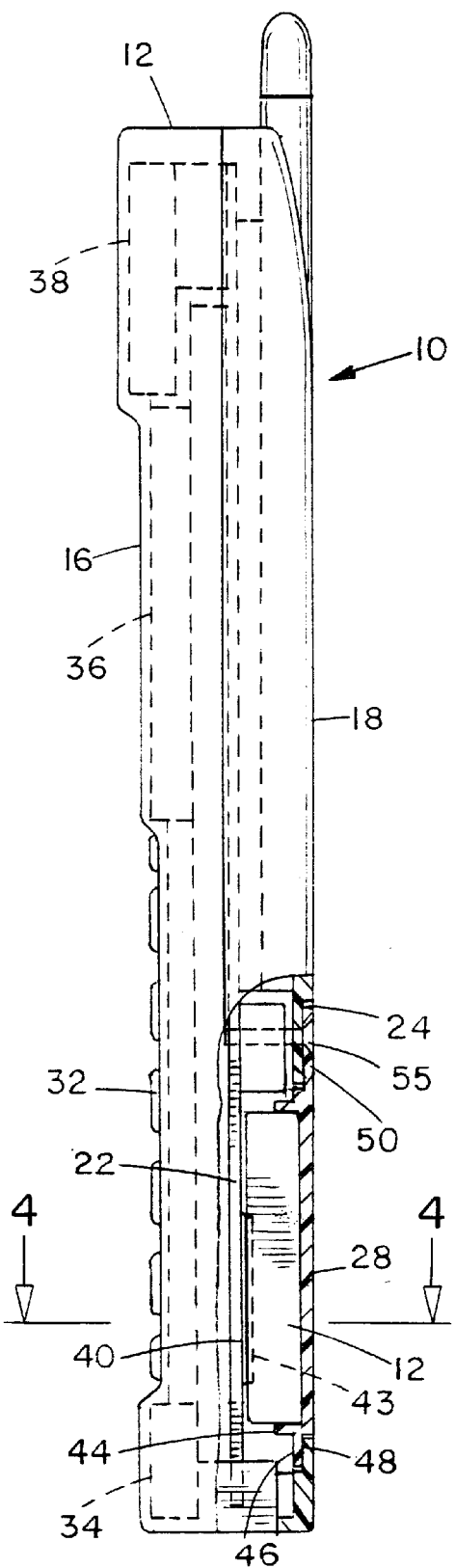
FIG. 3 is a side view of the phone, partially cut away to show the internal battery installation.
Figure 4:
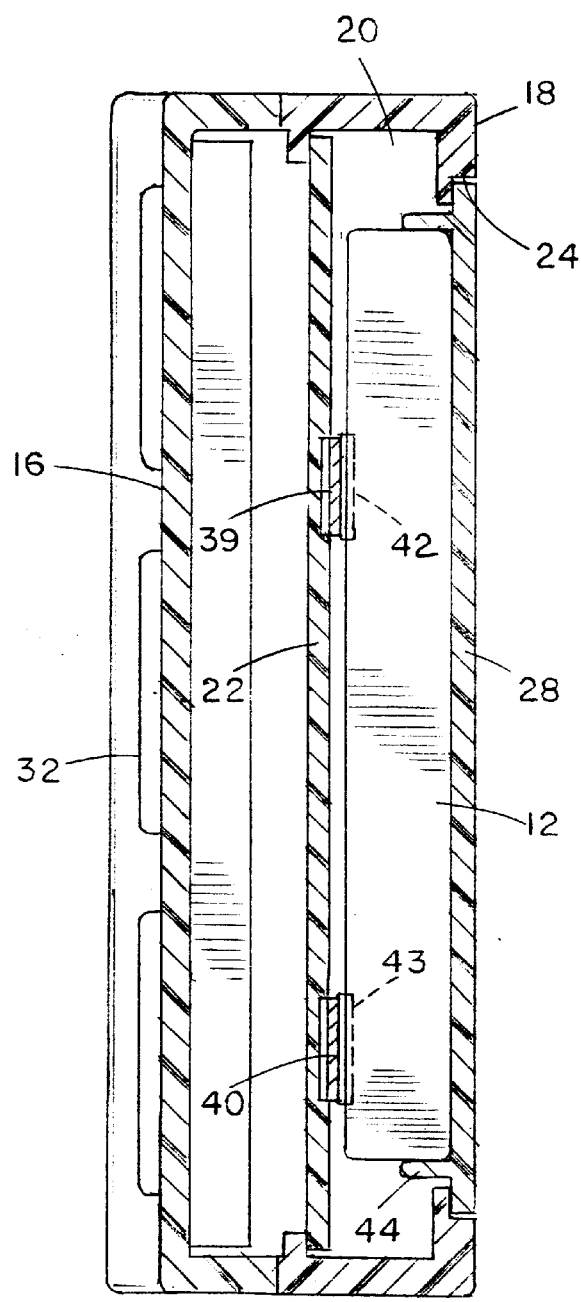
FIG. 4 is an enlarged sectional view taken on a line 4—4 of FIG. 3.

Battery 12 is preferably a very thin, rectangular prismatic cell with contact pads 42, 43 on one face (see FIGS. 3 and 4). Alternatively, strips of conductive adhesive may be provided on one face, and connected to the respective battery terminals via flex circuits (not illustrated). The lid 28 has a peripheral ridge or rib 44 projecting outwardly from its inner face to form a recess for seating the battery 12, as best illustrated in FIG. 4. The battery is preferably a snap fit in the recess formed by rib 44, so that the battery is automatically positioned in the battery receiving recess 26 when the lid is mounted in opening 24. The battery is a low profile battery of only around 6 mm. in height, so that the size dimensions, particularly the thickness, of the cavity will not be affected substantially by the need to house imbedded battery 12. It is anticipated that in the near future, the battery thickness may be reduced to as little as 4 mm. This would make the battery no thicker than the typical electrical components that are mounted on the board 22. The battery has no external housing requirement, and is not encased, but is mounted directly in the recess formed by ridge 44 making electrical contact with pads 39, 40 on the board 22 in the phone casing. This also reduces the space required to accommodate the battery.

In one embodiment, the battery 12 was a rectangular prismatic battery with a height or thickness of the order of 6 mm., a length of 47 mm., and a width of around 23 mm. The dimensions of the receiving recess 26 on board 22 were arranged to be of the order of 48 mm. length and 30 mm. width in order to accommodate the battery. The battery receiving recess 26 is located adjacent one end of the board and extends across the entire width of the board in FIGS. 1 to 4, although other positions (e.g. anywhere intermediate the two ends) and other orientations (i.e. rotation by 90 degree, 180 degrees or other suitable angle) may alternatively be used. FIG. 5 illustrates a modified embodiment of the phone 10' in which the battery opening 24' and the receiving recess 26' are located in a central position on the board. This embodiment is otherwise identical to that of FIGS. 1 to 4, and like reference numerals refer to like parts as appropriate.

In both of the embodiments describe above, the lid is releasably retained in opening 24 via tabs 46 which project from one end of the lid and engage in recesses 48 (see FIG. 3) beneath the rim at one end of opening 24, and a projection 50 from the opposite end of the lid. Projection 50 engages in recess 52 in the lower wall 18 adjacent opening 24, and the projection 50 and recess 52 have aligned through holes 53, 54 for receiving a screw fastener 55 for securing the lid in position with the tabs 46 locked beneath recesses 48, as best illustrated in FIG. 3. A suitable threaded hole 56 for receiving fastener 55 is provided on the board 22 in alignment with through hole 54.

In order to position the battery in the receiving area on the circuit card, it is first snapped into the inner side of lid 28 so as to be held in position by ridge 44, with the contacts facing inwardly. The lid 28 is then positioned in the opening by engaging tabs 46 in recesses 48, then positioning projection 50 in recess 52 and securing it in position by screw fastener 55. The battery will then automatically be positioned in the recessed area 26 on the board, as illustrated in FIGS. 3 and 4. As best illustrated in FIG. 4, the negative contact 43 connected to the negative battery terminal is aligned and in direct contact with negative contact pad 40 on the board when the lid is secured in position. Positive contact pad 39 will engage contact 42 connected to the positive battery terminal. However, if the battery is installed the wrong way around, the conductive strips 42, 43 will be offset from contact pads 39 and 40, insuring that the battery does not damage the phone or itself if the user puts the battery in backwards. In the illustrated embodiment, the battery and circuit board contacts are flat contact pads.

In an alternative embodiment, as illustrated in FIGS. 6 and 7, contact pads 42, 43 are replaced by spring loaded pogo pin contact which engage flat contact pads on the board. In the embodiment of FIGS. 6 and 7, removable lid 60 is designed for releasable engagement in an opening in a wall of phone unit (not illustrated) via tabs 62 which engage in slots or recesses in the opening in the phone wall, in a similar manner to lid 28 of the previous embodiments. A battery 64 is a snap fit in a recess on the inner face of lid 60. The battery terminals are connected to two of a series of pogo pin contacts 65 mounted on the inside of the lid adjacent battery 64. The remaining pogo pin contacts are connected to external contacts on the lid or phone casing to provide an external battery or charger connection through the lid to the main circuit board 22 inside the phone housing. Connections between the various contacts and the pogo pins are made via flex circuits 66.

FIG. 7 illustrates one of the pogo pin contacts 65 in more detail. The pin 65 has a compressible end portion 66 biased outwardly by spring 68 when the lid is detached from the phone housing. When attached, the end of portion 66 contacts a pad 69 on the circuit board, and is compressed to that the spring is loaded and a good contact is made. Similar pogo pin contacts may replace the contact pads 42, 43 of the previous embodiment. The board 22 may alternatively be provided with pogo pin contacts, with flat contact pads on the battery.

The imbedded battery of this invention is preferably used in conjunction with a circuit for controlling charging and discharging in conjunction with a piggyback battery, as described in our co-pending applications, Ser. No. 09/027,354, filed Feb. 20, 1998, entitled "POWER SUPPLY ASSEMBLY FOR PORTABLE PHONE", and Ser. No. 09/027,353, filed Feb. 20, 1998, entitled "EXTERNAL BATTERY ASSEMBLY FOR PORTABLE PHONE", the contents of which are incorporated herein by reference. In FIGS. 1 to 5, suitable connections 41 are provided for connecting the phone with a piggyback battery, as described in more detail in the co-pending applications referred to above, while in FIGS. 6 and 7, the contacts are provided on the outer face of lid 60. The control circuit in each case controls power supply to the phone such that power is provided by the imbedded battery whenever no piggyback battery is present, but is held in reserve whenever a piggyback battery is in use. This prolongs battery life. When connected to a charging unit, the imbedded battery is always charged first to maintain full charge.

Portable phone users will need to change the internal battery only after a large number of charge and discharge cycles. Typically, battery changing will only be required after more than one thousand charge/discharge cycles. With this arrangement, the user can readily access the internal battery without having to disassemble the phone in any way. All that is necessary is to remove screw 55, releasing lid 28 which can then be lifted out along with battery 12, avoiding the need for the user to try to pry the battery out of the phone casing separately from the lid. The old battery 12 can then be snapped out and replaced with a new battery, and the lid and battery are replaced together into the position illustrated in FIGS. 3 and 4.

By nesting a battery directly on the main circuit card assembly of a portable phone, the extra thickness of a conventional external battery case is removed. Additionally, by re-arranging components on the board to leave an exposed area of the board for receiving the battery, component stack up on the board is avoided. This allows the battery casing thickness to be reduced substantially, particularly when a very thin, low-profile rectangular prismatic cell battery is used. An imbedded internal battery has the additional advantage of allowing hot swapping of a piggyback battery while the phone is in call, as described in our co-pending application Ser. No. 09/027,354 referred to above.

Retention of the battery on the inner face of the lid 28 allows the battery to be installed and removed readily, without the need for any difficult finger manipulations to place it properly on the board or pry it up out of opening 24. The battery will automatically be positioned correctly on the board simply by positioning the lid to cover opening 24, and will automatically be lifted out whenever the lid is opened or removed. Although the lid is held in position by tabs or latches and a screw fastener in the illustrated embodiment, it will be understood that alternative fastener arrangements are possible. For example, the lid may be permanently hinged at one side to the rim of the opening, with a releasable latch at the other side.

A similar arrangement may be used for selectively positioning other, optional accessories onto a circuit card assembly of a portable phone, such as FM radio, subscriber identification module, software enhancement module (which may include drivers for different user interfaces, algorithms for improved performance, video games with dot matrix display in the phone, and so on), and hardware enhancements such as expanded phone book memory, voice recording DSP/memory, vibrator, loudspeaker, voice recognition hardware/software module, video game firmware module, GPS receiver, and the like, as well as batteries using alternative battery technologies such as lithium polymer. Such modules may be incorporated onto the circuit card 22 by suitably enlarging the exposed area of the board by re-arrangement of component positions, and providing suitable contacts and flex circuits for suitable connection of the added components into the phone circuitry. The accessories would use different contacts on the circuit board depending on the quantity and type of I/O required. This can be designed to enable users to buy and install add-on modules based on the features they most want and use on a daily basis. The arrangement may permit other electronic devices to be integrated into one common phone unit without compromising size, weight, or performance.

The portable phone with imbedded battery as described above allows a portable phone casing to be substantially reduced in size, rather than having the battery dominate the overall length, width and thickness of the phone as was common in the past As noted above, if used with a low-profile, rectangular prismatic cell of 6 mm. thickness, or thinner lithium polymer batteries, the battery will be no thicker than most of the components within the phone casing and will not dominate the thickness of the phone. With this arrangement, the phone thickness can be reduced to a maximum of around 15 to 16 mm. without any substantial increase in length or width. The phone length will typically be around 130 mm. or more, while the width will be of the order of 52 mm. If additional, optional components are to be accommodated, some additional increase in length and/or width may be required in order to provide the necessary free space on board 22, depending on the size of the additional components.

Although a preferred embodiment of the invention has been described above by way of example only, it will be understood by those skilled in the field that modifications may be made to the disclosed embodiment without departing form the scope of the invention, which is defined by the appended claims.

We claim:

1. A portable phone, comprising:
    an outer casing having opposite upper and lower walls, one of said walls having an opening for access to the interior of the casing;
    a lid releasably mounted in the opening for normally closing the opening;
    a main circuit board mounted in the outer casing, a plurality of phone components positioned on one side of the circuit board facing said one of said walls to leave a predetermined region of the board exposed, the exposed region comprising a battery receiving recess aligned with the opening;
    the battery receiving recess having a pair of contacts for receiving a battery power input; and
    an imbedded battery removably seated in the battery receiving recess, the battery having a pair of contacts in contact with the contacts in the recess, whereby the battery can be removed and replaced via the opening after releasing the lid.

2. The phone as claimed in claim 1, wherein the lid has an outer face and an inner face, and the inner face has a ridge for snap engagement with the battery to hold the battery in position for automatic insertion into the recess and removal from the recess on closing and opening the lid.

3. The phone as claimed in claim 1, wherein the battery is a prismatic cell having no outer casing.

4. The phone as claimed in claim 3, wherein the battery has a thickness of less than 10 mm.

5. The phone as claimed in claim 4, wherein the phone casing has a thickness no greater than 20 mm.

6. The phone as claimed in claim 1, wherein the battery receiving recess has predetermined dimensions slightly greater than the corresponding battery dimensions.

7. The phone as claimed in claim 1, wherein the contacts in the recess and on the battery are offset from the center of the recess such that they are aligned when the battery is in a first orientation relative to the recess, and are out of alignment if the battery is in any other orientation.

8. The phone as claimed in claim 7, wherein the battery has an upper face, a lower face positioned against said recess, a positive and a negative terminal, a positive contact linked to said positive terminal and aligned with said positive contact on said circuit board when the battery is in said first orientation, a negative contact linked to said negative terminal and aligned with said negative contact on said circuit board in said first orientation, the positive and negative battery contacts being offset from said negative and positive contact on the board, respectively, when the battery is in a second orientation opposite to said first orientation, whereby damage to the phone or battery is prevented.

9. The phone as claimed in claim 1, wherein at least one of said pairs of contacts comprises pogo pins.

10. The phone as claimed in claim 1, wherein the circuit board has a length and a width substantially equal to the length and width of the phone casing, respectively, and opposite longitudinal ends, the battery receiving recess being located adjacent one longitudinal end of the board and extending across the entire width of the board.

11. The phone as claimed in claim 1, wherein the circuit board has opposite longitudinal ends and the battery receiving recess is located intermediate the longitudinal ends of the board.

* * * * *